(No Model.)
J. H. CURTIS.
APPARATUS FOR PURIFYING SEWAGE OR WATER.
No. 564,049. Patented July 14, 1896.
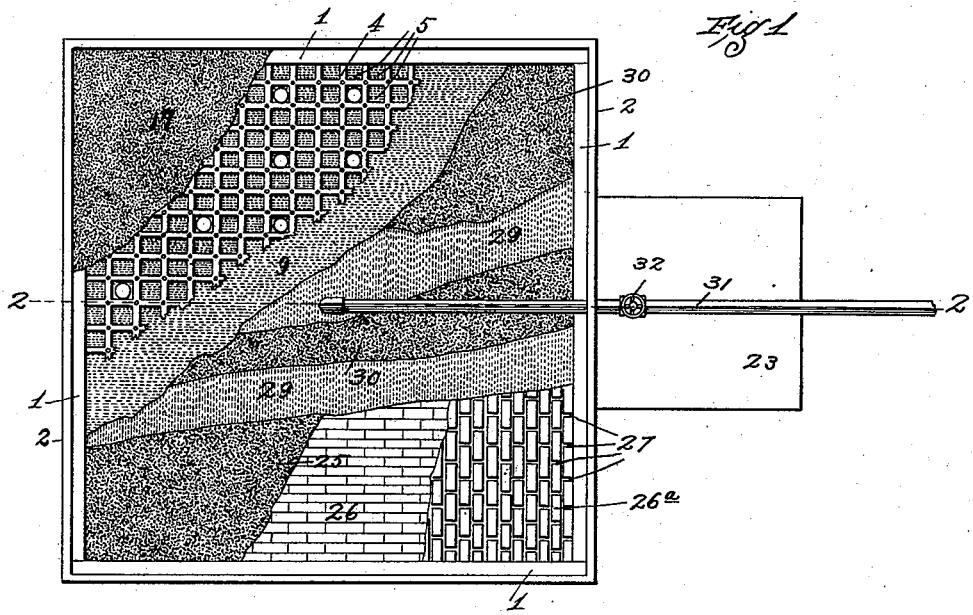
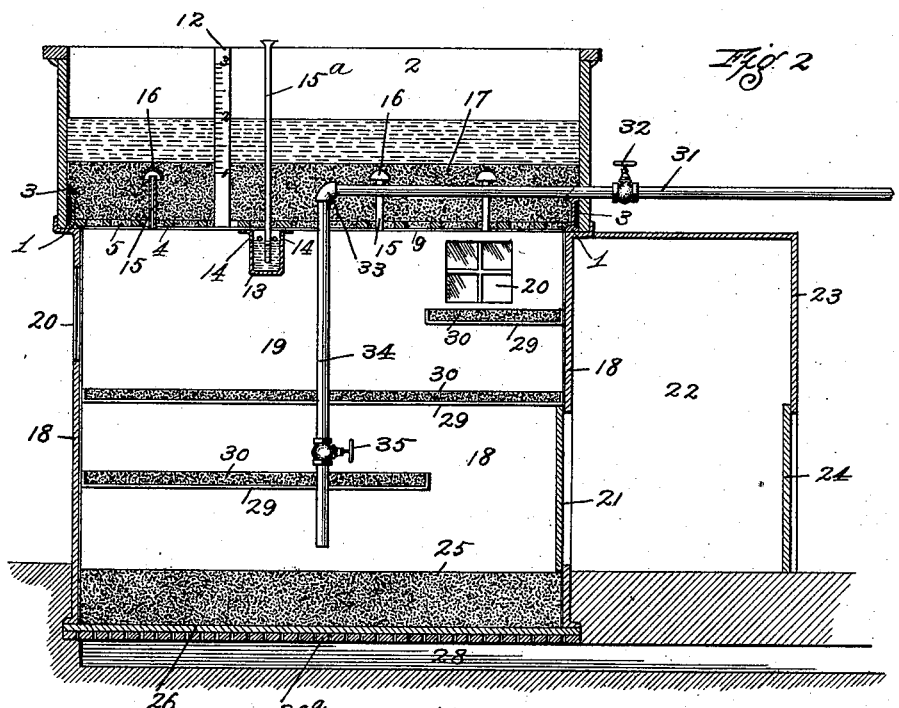
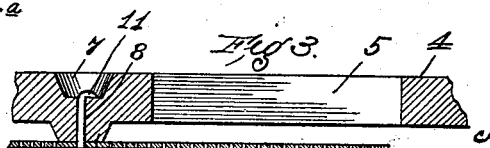
Inventor:
John H. Curtis.
Attest:
John L. Tunison
M. O. Smith
By Higdon & Higdon & Longan
Attys.

UNITED STATES PATENT OFFICE.

JOHN H. CURTIS, OF ST. LOUIS, MISSOURI.

APPARATUS FOR PURIFYING SEWAGE OR WATER.

SPECIFICATION forming part of Letters Patent No. 564,049, dated July 14, 1896.

Application filed February 11, 1895. Serial No. 538,055. (No model.)

*To all whom it may concern:*

Be it known that I, JOHN H. CURTIS, of the city of St. Louis, State of Missouri, have invented certain new and useful Improvements in Apparatus for Purifying Sewage or Water, of which the following is a full, clear, and exact description, reference being had to the accompanying drawings, forming a part hereof.

My invention relates to an apparatus for purifying sewage or water.

The primary object of my invention is to filter and purify water or liquid by disintegrating or reducing the same to spray.

The further object of my invention is to provide means whereby large quantities of water, such as the sewage or water supply of a city, may be thoroughly purified, filtered, and rendered as nearly chemically pure as possible.

The further object of my invention is to construct an apparatus of this class that is simple in construction and operation, capable of being built or constructed at a minimum cost, and very efficient and effectual in use.

In the drawings, Figure 1 is a top plan view of my improved purifying and filtering apparatus, parts thereof being broken away to more clearly illustrate same. Fig. 2 is a vertical longitudinal sectional view taken approximately on the indicated line 2 2 of Fig. 1. Fig. 3 is a detailed sectional view showing the means I employ in securing two of the reticulated plates together.

In referring by numerals to the accompanying drawings, 1 1 indicate I-beams of any suitable size, the same being suitably joined or fastened together at their meeting ends.

2 indicates vertical side walls, the same being of any height desired, and joined in an ordinary manner at their lower ends to the I-beams 1. It is essential that the joint between these side walls 2 and the I-beams 1 be made water-tight, which may be accomplished by the use of a layer of cement, such as indicated by the numeral 3.

4 indicates a metallic frame or grill, the apertures or openings 5 of which are of a uniform size. This grill 4 is adapted to be positioned upon and sustained by the inwardly-extending flanges on the lower ends of the I-beams 1. Formed integral with and depending from the under side of this grill and at the junctures of the webs of said grill are circular lugs 6. Formed in the upper face of the grill and directly above the lugs 6 are circular depressions 7. Rivet or bolt holes 8 extend from these depressions 7 through the webs of the grill and through the lugs 6.

A metallic plate 9 is constructed with minute perforations and is adapted to be located immediately beneath the grill 4, and be securely held thereto by means of rivets or wrought-nails 10, passing through said perforated plate and through the aperture 8. The upper ends of these rivets or nails 10 are clenched or upset, as indicated by the numeral 11. By this construction it will be seen how the major portion of the surface of the plate 9 is held out of contact with the under surface of the grill 4.

Vertically arranged and extending from the perforated plate 9 to a point in the plane occupied by the top edges of the side walls 2 is a graduated water-gage 12, the purpose of which will be presently made plain.

Rigidly fixed to the under side of the perforated plate 9 is a cup or receptacle 13, the same being provided with a series of apertures 14 near its top edge. Passing through the perforated plate 9, its lower end terminating in the lower portion of the cup 13, is a vertically-arranged glass air-gage $15^a$, the upper end of which terminates in the same plane as that occupied by the upper end of the water-gage 12. Aspirators comprise vertically-arranged tubes 15, the same being vertically arranged and extending from the perforated plate 9 to points in a plane slightly above the grill 4. The upper ends of these tubes 15 are surmounted by inverted cup-shaped caps 16, there being communication or air outlets between the upper ends of the tubes 15 and said caps 16. A layer or body of cleaned sand 17 is located directly upon the grill 4 and perforated plate 9, the surface of said body of sand being slightly above the caps 16 of the aspirators. The receptacles formed by the I-beams 1, side walls, and perforated plates 4 and 9 are located upon a suitable structure comprising the four walls 18, the same being so arranged as to form the air-chamber 19.

Windows 20, suitably glazed, are located at various points in the walls 18 of air-chamber 19, and an entrance-door, such as 21, is provided in one of said walls 18. A vestibule 22 is formed adjacent the door 21 by a suitable structure 23, in one wall of which is arranged a door 24. Located in the bottom of the air-chamber 19 and held in position by means of the side walls 18 thereof is a body of cleaned sand 25, beneath which is a layer of brick 26, the same being laid adjacent one another without mortar, so as to leave no spaces or interstices for the sand 25 to pass through.

Immediately below the brick 26 is a second layer of brick 26a, the same being laid so as to leave slight spaces or interstices, such as 27. A suitably-formed passage 28 leads from the under side of the loosely-laid brick 26 to any desired point. Horizontally arranged within the air-chamber 19 are a series of perforated plates 29, analogous to the plates 9, and upon which are located layers of cleaned sand 30. A horizontal pipe 31 is provided with a cut-off valve 32, and enters the receptacle formed by the plates 4 and 9 and side walls 2 at any suitable point, and leads to approximately the center thereof. At this point said horizontal pipe is joined by means of any ordinary elbow 33 to a vertically-arranged pipe 34, that leads to a point below the lowermost perforated plate 29 and adjacent the body of sand 25. This vertical pipe 34 is provided with a cut-off valve 35, the same being at any suitable point in said pipe 34 within the air-chamber 19. The pipe 31 leads from any suitable air-compressor.

The inner faces of the walls of the air-chamber 19 are lined with sheet metal in any well-known manner.

The operation of my improved apparatus is as follows: When the valves 32 and 35 in the compressed-air pipe 31 have been closed and a quantity of water is discharged onto the body of sand 17, said water will percolate through said sand, through the grill 4, the perforated plate 9, bodies or layers of sand 30, perforated plates 29, sand 25, and layers of brick 26 and 26a, and into the discharge-passage 28. As soon as this action takes place the valves 32 and 35 in the compressed-air pipe 31 are opened and compressed air allowed to discharge in the chamber 19. As soon as the air-pressure within the chamber 19 is sufficient to overcome the pressure of the water upon the body of sand 17 said water will cease to pass through and discharge from the apertures or perforations in the plate 9. When this point has been reached, the cut-off valves 32 and 35 are so manipulated as that the pressure exerted by the air discharged into the chamber 19 is slightly less than the pressure of the body of water upon the sand 17. This will allow the water within the receptacle to slowly percolate and filter through the body of sand 17 and discharge in a disintegrated form from the under side of the plate 9. From thence it falls onto the layers or bodies of sand 30, which are located upon the perforated plate 29, percolates and filters through said bodies of sand and plates, and from thence gravitates onto the body of sand 25. After passing through said body of sand 25 it is discharged through the layers of brick 26 and 26a, to be carried off through the passage 28 in a thoroughly purified and filtered condition. As the water passes through the bodies of sand it is separated into very finely-divided parts, and all suspended foreign matter in said water is caught and held by said bodies of sand, thereby accomplishing the desired result. During the process of purification and filtration air from the chamber 19 will pass through the aspirator-tubes 15 and be discharged into the body of sand 17, adjacent the top surface thereof, to commingle with and aerate the water as it starts on its passage through the body of sand 17. Water will fill in the cup 13 to the apertures 14, near the top thereof. The compressed air will enter said apertures in the cup 13 and force a portion of the water in said cup up through the glass air-gage 15, and by having said air-gage 15 graduated the operator or attendant can at all times ascertain the exact amount of air-pressure within the chamber 19. By having the water-gage 12 properly graduated, the operator or attendant can by glancing at the same and at the air-gage 15 regulate the pressure of air within the chamber 19 relative the amount of water within the receptacle and upon body of sand 17. Thus it will be seen how I have constructed an apparatus wherein the air and the water to be purified are separated into finely-divided parts mechanically, and perfect filtration of said water thereby accomplished. By regulating the pressure of the air within the chamber 19 the water may be allowed to percolate and filter through the body of sand 17 and the grill and perforated plate in any quantity desired.

An apparatus of this construction possesses superior advantages in point of simplicity, durability, and general efficiency.

What I claim is—

1. In an apparatus for purifying liquids, a receptacle, an air-chamber located beneath said receptacle, a grill or reticulated grate, located between said receptacle and air-chamber, a perforated plate located beneath said grill, a body of filtering material located upon said grill, a body of filtering material located in the bottom of the air-chamber, a series of perforated plates, horizontally arranged within the air-chamber, bodies of filtering material located upon said perforated plates and tubular connections for discharging compressed air into the air-chamber, as set forth.

2. In an apparatus for purifying liquids, a suitable receptacle an air-chamber located beneath said receptacle, a body of filtering material sustained between the receptacle and the air-chamber, a body of filtering material located in the bottom of the air-chamber, perforated plates horizontally positioned within the air-chamber, bodies of filtering material located upon said perforated plates, and tubular connections for discharging compressed air into the air-chamber, as set forth.

3. In an apparatus for purifying liquids, a suitable receptacle, an air-chamber located beneath said receptacle, and a grill or reticulated plate located between the receptacle and the air-chamber, a perforated plate fixed to the under side of the grill, a body of filtering material located upon said grill, aspirators comprising tubes and inverted cup-shaped caps on their upper ends leading from the air-chamber into the body of filtering material and tubular connections for discharging a compressed-air supply into the air-chamber, as set forth.

In testimony whereof I affix my signature in presence of two witnesses.

JOHN H. CURTIS.

Witnesses:
PRITCHARD SHORE,
JOHN C. HIGDON.